Jan. 8, 1952     L. SANTOSUOSSO     2,582,167
SAFETY LATCH FOR AUTOMOBILE DOORS
Filed Nov. 27, 1948     2 SHEETS—SHEET 1
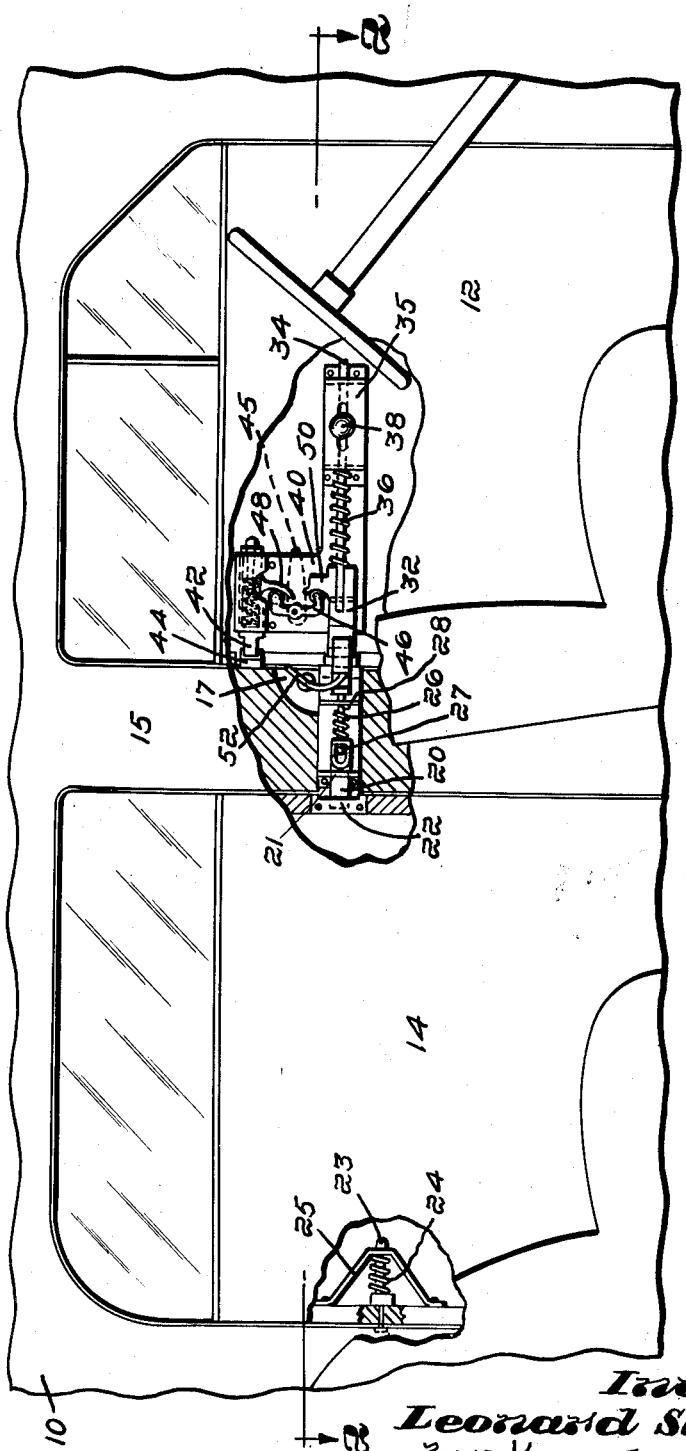
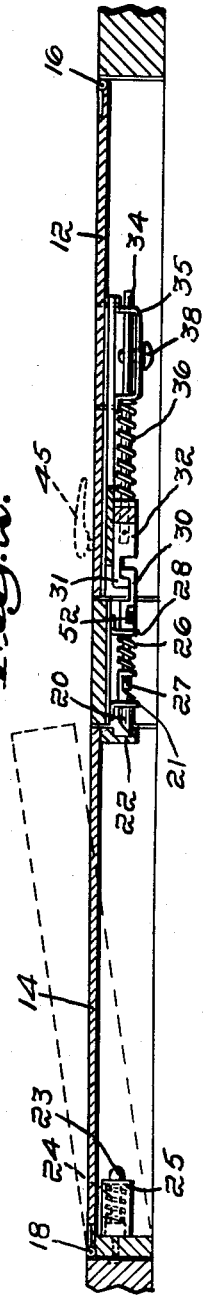
Inventor:
Leonard Santosuosso,
by Kenway, Jenney, Witter & Hildreth
Attorneys

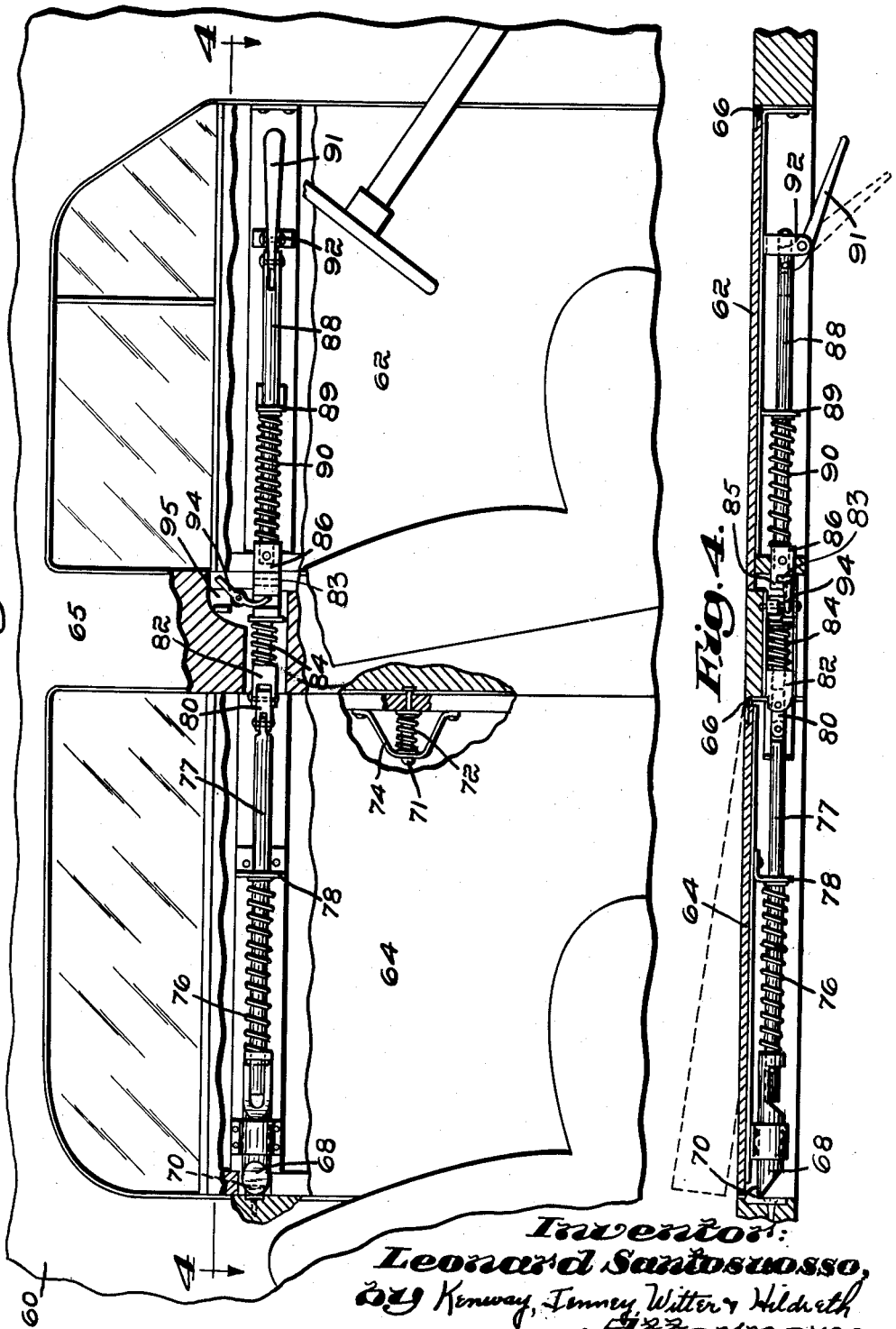

Patented Jan. 8, 1952

2,582,167

UNITED STATES PATENT OFFICE 2,582,167

SAFETY LATCH FOR AUTOMOBILE DOORS

Leonard Santosuosso, Revere, Mass.

Application November 27, 1948, Serial No. 62,262

6 Claims. (Cl. 292—34)

This invention relates to latches for automobile doors and particularly to a novel latch mechanism for holding the rear door closed and permitting its release only from the front door, thereby eliminating accidents caused particularly by children in releasing the latch and permitting opening of the door when the vehicle is in motion. The production of an improved latch mechanism of this nature and for the purpose described comprises the primary object of the invention.

These and other features of the invention will be more readily understood and appreciated from the following detailed description of preferred embodiments thereof, selected for purposes of illustration and shown in the accompanying drawings in which—

Fig. 1 is a fragmentary inside elevation of an automobile equipped with one embodiment of my invention, Fig. 2 is a sectional view taken on line 2—2 of Fig. 1, the wall portion of the vehicle being omitted, Fig. 3 is a view like Fig. 1 but showing a modified construction, Fig. 4 is a sectional view taken on line 4—4 of Fig. 3.

In Figs. 1 and 2 I have illustrated an automobile 10 having a front door 12 and a rear door 14 at opposite sides of the side wall portion 15 of the automobile. The front door is hinged at 16 to open forwardly and the rear door is hinged at 18 to open rearwardly. The rear door is held in closed position by a latch 20 carried by the wall 15 and engaging a keeper 22 on the door. A plunger 23 operated by a compression spring 24 bearing against a bracket 25 is adapted to open the door to the broken line position when the latch is released.

The latch 20 is normally forced to the locking position by a spring 26 on a latch rod 27 and backed up by a fixed bracket 28. The latch 20 is slidably mounted in a supporting bracket 21 and the rear end of the rod 27 extends through a hole in the forward end of the latch and is provided with a cross pin whereby forward movement of the rod withdraws the latch. A link 30 connected to the forward end of the latch rod extends outwardly of the front door opening and is provided with a hook engageable with a like hook 31 on an element 32 carried by the front door. A rod 34 slidably mounted in a bracket 35 on the front door is connected to the element 32 by a cross pin and the springs 26 and 36 normally maintain the rod and element in the position shown in Fig. 2.

An operating knob 38 is carried by the rod 34 and guided by a slot in bracket 35 and movement of the knob forwardly is adapted to release the latch.

The member 40 which supports the element 32 is an integral part of the bracket 35 and extends upwardly therefrom and supports a latch 42 for the front door. A spring in the member 40 normally engages this latch with its keeper 44. A handle 45 for and outside of the front door is mounted on a shaft carrying a forked lever 46 on its inner end inside the door. The upper fork engages a finger 48 extending downwardly from the latch and the lower fork engages a finger 50 extending upwardly from the element 32. Rotation of the handle in one direction is adapted to release the front door latch and rotation in the opposite direction is adapted to release the rear door latch.

It will be apparent that the hook connection at 31 permits opening of the front door when the latch 42 is retracted by operation of handle 45 and the hooks are reengaged when the door is closed. When the front door is open the rear door latch can be released by rotating a pivoted member 52 mounted in the opening 17 within the wall 15 and having a lower end in engagement with the latch.

In Figs. 3 and 4 I have illustrated a modified form of latch for the rear door wholly independent of the front door latch. In this case the automobile 60 has a front door 62 and a rear door 64 at opposite sides of the side wall pillar portion 65. Both doors are hinged as indicated at 66 to open forwardly. The rear door is held in closed position by latch 68 mounted on the door and engaging the keeper 70 secured to the car body. A plunger 71 operated by a compression spring 72 bearing against a bracket 74 is adapted to open the door to the broken line position when the latch is released.

The latch 68 is normally forced to locking position by a spring 76 on a latch rod 77 and backed up by a bracket 78, the rod being connected to the latch by a cross pin similar to the cross pin connecting the rod 34 to the element 32. A short link 80 pivotally connects the rod 77 to a rod 82 mounted in the wall 65, the pivotal axes being disposed vertically to permit opening of the rear door. A spring 84 can be provided on the rod 82 for cooperating with and supplementing the spring 76 if desired. The forward end of the spring 84 seats against a fixed abutment and its rear end engages a shoulder on the rod 82 and forces the rod rearwardly, the rod being freely movable longitudinally through the abutment.

The forward end of the rod 82 extends outwardly of the pillar 65 and into the front door opening and is provided with a hook 83 engageable with a like hook 85 on an element 86 carried by the front door, like the hooks 30 and 31 in Fig. 2. A rod 88 slidably mounted in a bracket 89 on the door is connected to the element 86 and a spring 90 on the rod normally maintains the rod in the position of Fig. 4. A lever 91 pivoted to a bracket 92 is connected to the rod and movement of the lever to the broken line position is adapted to move the rods and latch forwardly and release the latch.

It will be apparent that the hook connection at 85 permits opening of the front door and the hooks are reengaged when the door is closed. When the front door is open the rear door latch can be released by rotating a pivoted member 94 mounted in an opening 95 within the wall 65 and having a lower arm extending into a recess in the hook end of the rod 82. The front door can be provided with the usual independent latch operated by outside and inside handles.

My invention provides a novel and useful latch mechanism adapted to release the rear door latch from the front compartment, thereby making it impossible to release the rear door from the rear compartment and eliminating accidents caused by opening of the rear door when the car is in motion. My novel latch mechanism has also other important and desirable uses such for example as providing a taxicab door latch that can be released by the driver in the front compartment.

Having thus disclosed my invention what I claim as new and desire to secure by Letters Patent is:

1. In an automobile having front and rear doors in alignment longitudinally of the vehicle, a forwardly and rearwardly movable latch adapted to hold the rear door closed when the latch is in its rearmost position, a spring normally moving the latch rearwardly to door latching position, an outwardly facing hook connected to the latch at the rear margin of the front door opening, and latch releasing mechanism carried by the front door and including an inwardly facing hook disposed to interlock with the first named hook when the front door is closed, said interlocking hooks providing a connection between said mechanism and the latch for moving the latch forwardly to released position by said mechanism when the front door is in closed position.

2. The mechanism defined in claim 1 plus a releasing element associated with the latch and mounted on the automobile between the two doors for releasing the latch, said element being accessible through an opening within the side wall of the automobile when the front door is open.

3. The mechanism defined in claim 1 in which movement of said latch releasing mechanism in one direction releases said latch, a latch for holding the front door in closed position, and means providing a connection between said latch releasing mechanism and the front door latch for releasing the front door latch when said latch releasing mechanism is moved in the other direction.

4. The mechanism defined in claim 1 in which said latch is carried by the vehicle between the front and rear doors, said spring normally forcing the latch rearwardly into latching engagement with the rear door.

5. The mechanism defined in claim 4 plus a spring pressed latch carried by the front door for locking the front door closed, and in which said latch releasing mechanism includes a rotary handle on and exteriorly of the front door and cooperating means adapted to release the rear door latch when the handle is rotated in one direction and to release the front door latch when the handle is rotated in the other direction.

6. The mechanism defined in claim 1 in which the rear door is hinged on a vertical axis located at the forward margin of the rear door, and a pivotal joint in the latch connection between the latch and first named hook permitting opening of the rear door.

LEONARD SANTOSUOSSO.

REFERENCES CITED

The following references are of record in the file of this patent:

UNITED STATES PATENTS

| Number | Name | Date |
| --- | --- | --- |
| 2,111,687 | Webb | Mar. 22, 1938 |
| 2,122,612 | Knapp | July 5, 1938 |
| 2,160,629 | Tibbetts | May 30, 1939 |
| 2,174,231 | Vandeveld | Sept. 26, 1939 |
| 2,221,044 | Dimick | Nov. 12, 1940 |
| 2,456,229 | Weeks | Dec. 14, 1948 |